United States Patent [19]

Tillequin

[11] 4,421,065
[45] Dec. 20, 1983

[54] HEATING EQUIPMENT FOR AN INSTALLATION USING STEAM AND HEATED GAS

[75] Inventor: Jean Tillequin, Paris, France

[73] Assignee: Creusot-Loire, Paris, France

[21] Appl. No.: 323,630

[22] Filed: Nov. 20, 1981

Related U.S. Application Data

[63] Continuation of Ser. No. 100,219, Dec. 4, 1979, abandoned.

[30] Foreign Application Priority Data

Dec. 6, 1978 [FR] France .................................. 78 34357

[51] Int. Cl.³ .............................................. F22B 7/00
[52] U.S. Cl. ................................. 122/155 R; 122/6 A; 122/136 R; 122/138; 122/149
[58] Field of Search .......... 122/155 R, 155 A, 166 R, 122/135 F, 135 A, 136 R, 137, 138, 142, 149, 151

[56] References Cited

U.S. PATENT DOCUMENTS

| | | | |
|---|---|---|---|
| 1,421,902 | 7/1922 | Brown | 122/166 R |
| 2,630,103 | 3/1953 | Forest | 122/138 |
| 2,674,981 | 4/1954 | Clarkson | 122/149 |
| 3,685,496 | 8/1972 | Stiefel | 122/149 |
| 3,814,062 | 6/1974 | Vollhardt | 122/6 A |
| 4,029,057 | 6/1977 | Frechette nee Bussieres | 122/149 |
| 4,291,649 | 9/1981 | Boder | 122/136 R |

Primary Examiner—Henry C. Yuen
Attorney, Agent, or Firm—Pollock, Vande Sande & Priddy

[57] ABSTRACT

Heating equipment for supplying steam and heated gas, including a combustion chamber from which come flue gases which flow through an enclosure, heating on the way at least one bundle of tubes in which water flows and gives off steam, and which further includes at least one bundle of tubes traversed by a gas and located in the enclosure so as to be heated by the flue gases from the combustion chamber.

11 Claims, 5 Drawing Figures

HEATING EQUIPMENT FOR AN INSTALLATION USING STEAM AND HEATED GAS

This is a continuation of application Ser. No. 100,219, filed Dec. 4, 1979 now abandoned.

FIELD OF THE INVENTION

The present invention refers to heating equipment suitable for supplying steam and a heated gas to an installation for processing chemical products, especially petroleum or petrochemical products, which employs this steam and hot gas.

The equipment in accordance with the invention is applicable particularly to a refinery installation of the type comprising distillation and catalytic reforming units and a steam turbine for the production of electrical or mechanical energy.

BACKGROUND

In numerous installations for processing chemical products it is necessary to have available both steam and a hot gas employed generally in the reactions. The steam is employed for supplying heat to the chemical reactions or for heating certain products. It may serve for feeding steam ejectors. It also serves for feeding a steam turbine which supplies mechanical or electrical energy.

Thus, in a unit for refining petroleum products the units for fractional distillation under pressure or under vacuum and the units for catalytic cracking or for catalytic reforming necessitate the application of heat, and require that the products which enter be heated. In a unit for atmospheric distillation, for example, the crude petroleum, after having been preheated, is heated to a temperature lying between 350° and 370° C. The chain of catalytic reforming operates at a temperature in the range 460° and 580°. Present refineries are equipped, in addition to the boiler or boilers supplying the steam, with process furnaces which serve to heat the products before or during the reactions or processing.

It has been proposed to employ a steam boiler operating at a pressure higher than 120 bars for feeding the distillation columns which play the part of condensers. The condensation of steam at high pressure and high temperature assures the distillation of the crude. Another steam circuit at high pressure feeds a back-pressure turbine in which the steam is expanded to different pressure levels corresponding to different levels of condensation temperatures.

This steam, expanded to different extents, is employed for heating, for example for the heating of the crude petroleum before its entry into the columns. This method enables substantial improvement in the energy balance of the refinery. However, the gases employed in the chain of catalytic reforming are heated in the process furnaces, which leads to certain disadvantages. These furnaces are very inefficient. Furthermore, the temperature of the gas feeding the catalytic reforming may vary as a function of the accidental overheating which is inevitable in a furnace. Finally, the dispersion of furnaces and boilers about the refinery complicates the operation and has the effect that the area occupied by the thermal equipment is large.

SUMMARY OF THE INVENTION

The invention overcomes the aforesaid disadvantages. Its is a heating equipment which is intended for an installation for processing chemical products, and which employs superheated steam and hot gas and enables a reduced consumption of energy compared with the consumption of existing installations. The process furnaces which customarily equip present installations may be reduced in number. The object of the invention is in particular a heating equipment supplying superheated steam and hot gas, which assures economy in energy, good regulation of the temperature of the gas and simplified operation. A further object of the invention is the application of this equipment to a refinery installation.

In accordance with the invention, the heating equipment includes a combustion chamber from which come flue gases which flow through an enclosure, heating on the way at least one tube bundle in which water flows and gives off steam, and it includes at least one bundle of tubes traversed by a gas and located in the enclosure so as to be heated by the flue gases from the said combustion chamber.

The equipment includes a partition dividing the enclosure into two chambers each of which is traversed by a stream of flue gases, and of which one contains the bundle traversed by the gas and the other contains at least one bundle of superheater tubes fed with dry steam. In accordance with another characteristic of the invention, the equipment includes two bundles of superheater tubes fed with dry steam and heated in succession by the flue gases.

Other characteristics and advantages of the invention will become apparent from the description which is to follow and which refers to the attached drawings.

DETAILED DESCRIPTION

The equipment in accordance with the invention is integrated into an installation comprising units which employ steam and a hot gas which participates in the reactions. Thus the units may be units for distillation or catalytic reforming, or a back-pressure turbine which supplies mechanical or electrical energy. The expanded steam which leaves the turbine is employed in known manner for various operations, especially for the heating of products.

Figure 1:
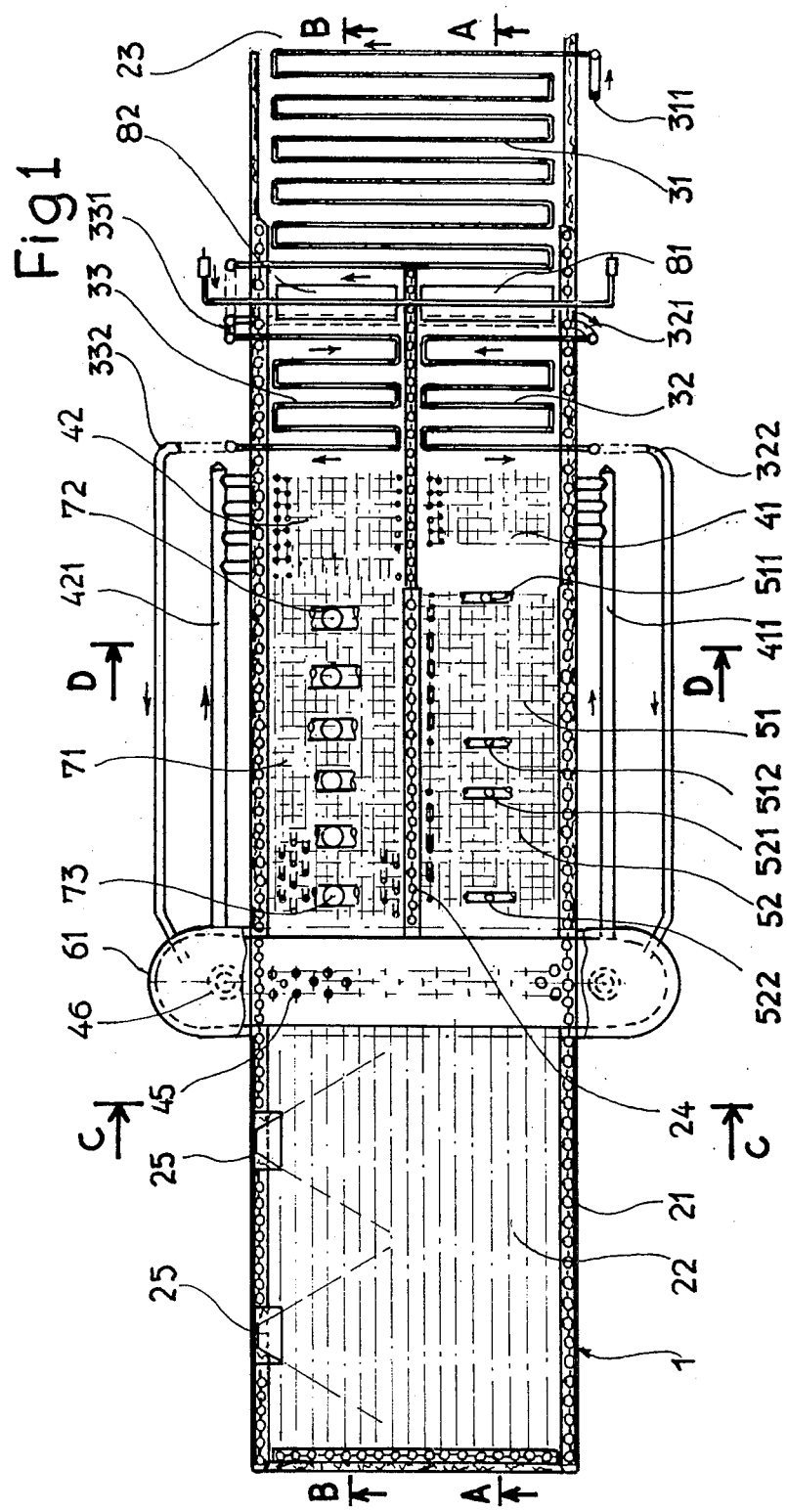
FIG. 1 is a horizontal section through the heating equipment in accordance with the invention.
Figure 2:
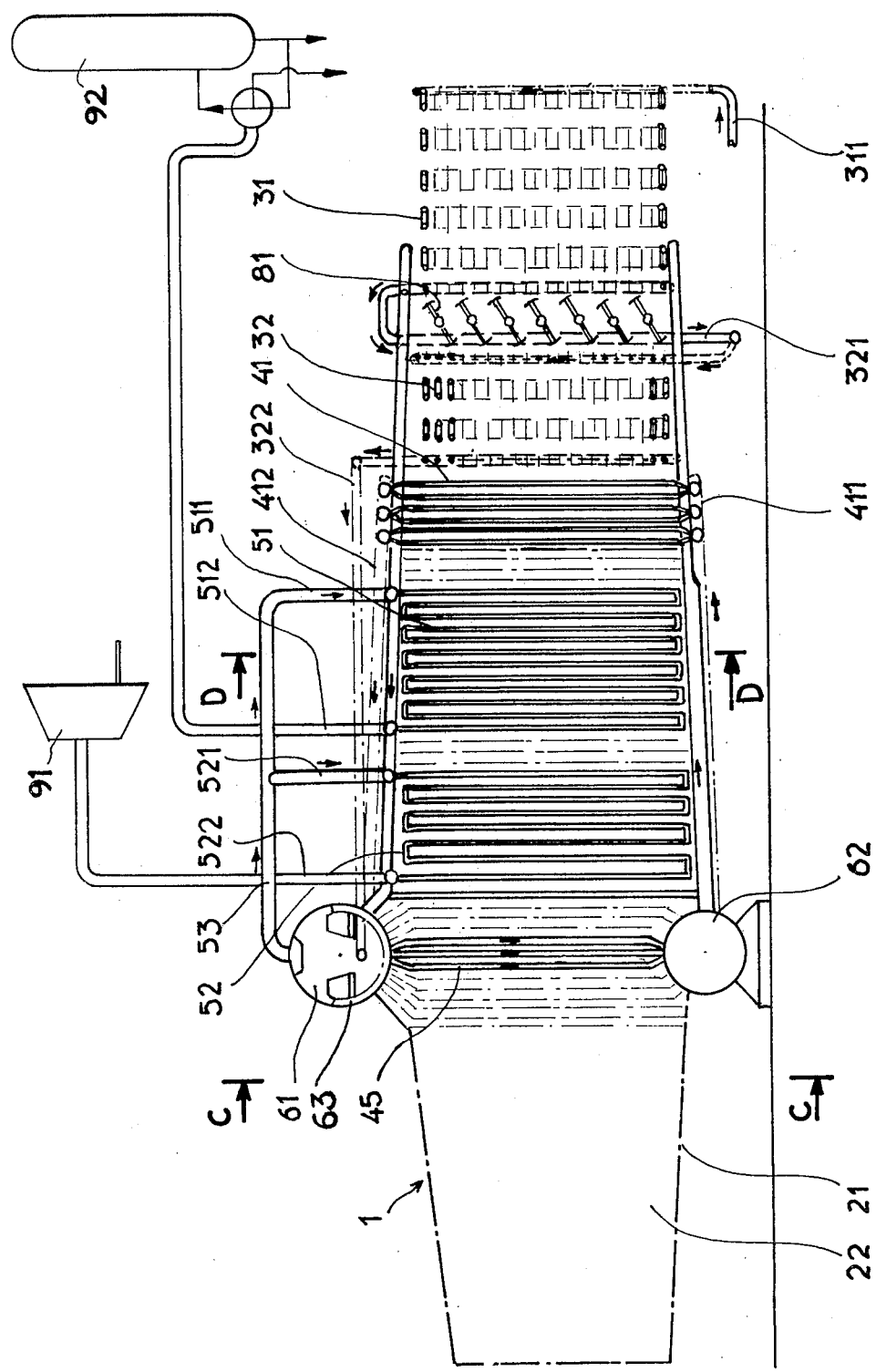
FIG. 2 is a vertical longitudinal section along A—A in FIG. 1.
Figure 3:
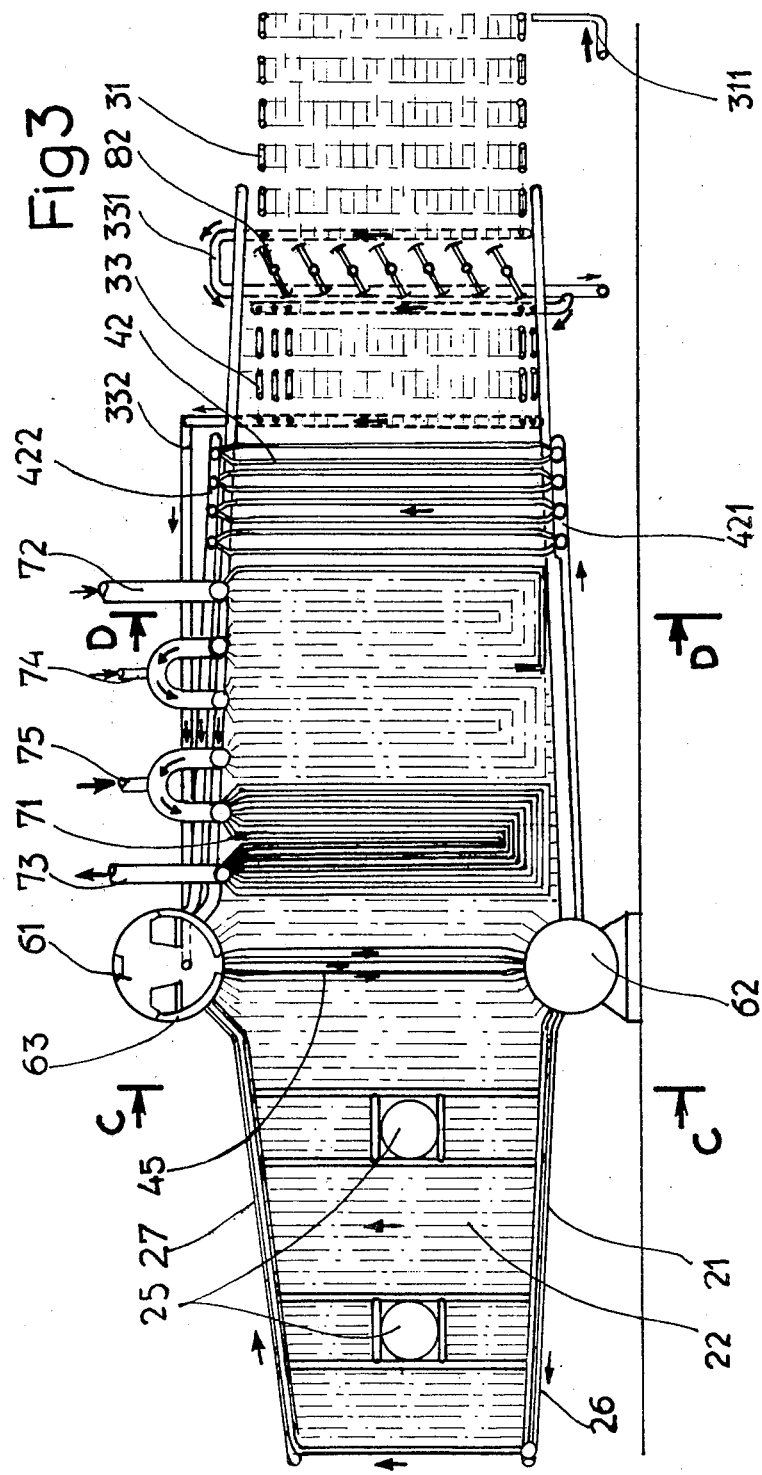
FIG. 3 is a vertical longitudinal section along B—B in FIG. 1.
Figure 4:
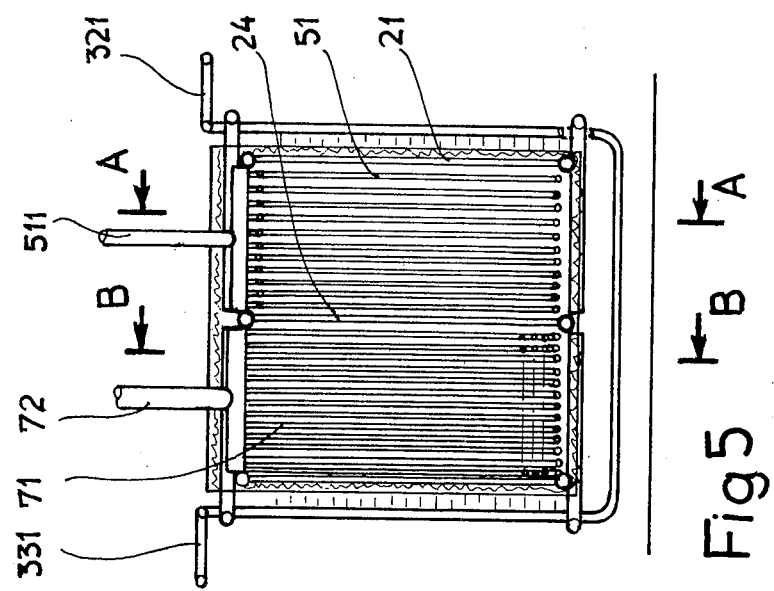
FIG. 4 is a vertical cross-section along C—C in FIGS. 1 to 3.
Figure 5:
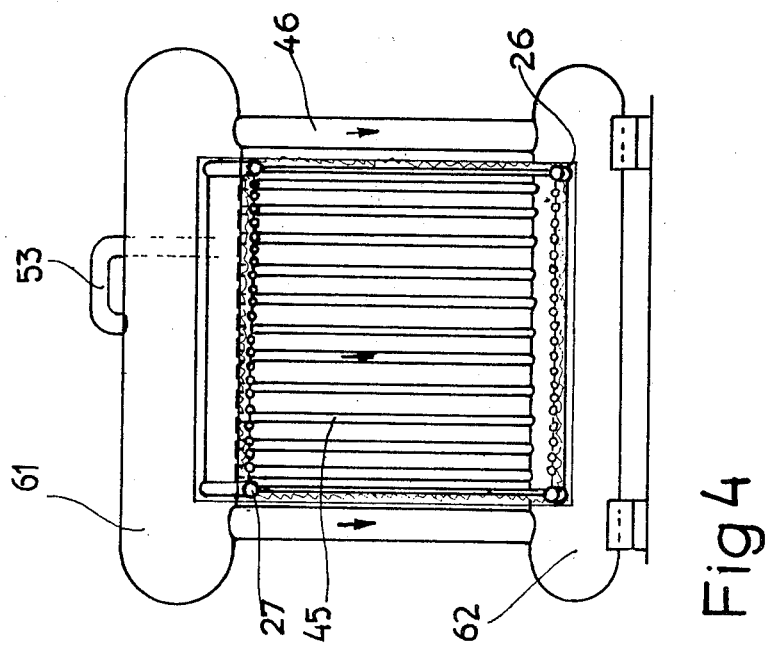
FIG. 5 is a vertical cross-section along D—D in FIGS. 1 to 3.

The heating equipment represented in FIGS. 1 to 5 supplies superheated steam and as well as a hot gas.

The heating equipment referenced as a whole by 1 is heated by burners 25 arranged along the side of a combustion chamber or hearth 22. The flue gases leave the chamber 22 and flow through an enclosure 21 which channels them. They are discharged from the equipment through an outlet 23 by natural draught or by forced, induced or balanced mechanical draught. Various circuits or bundles of tubes, referenced 31,32,33,41,42,51,52 are arranged in the enclosure 21 where they are heated on the way by the flue gases. These bundles are traversed by water in the liquid state or by steam. A circuit or bundle of tubes 71 traversed by a gas is likewise located in the enclosure so as to be heated by the flue gases proceeding from the hearth or from the combustion chamber A longitudinal partition 24 devides the enclosure 21 into two chambers each of which is traversed by a stream of flue gases parallel with this partition. One of these chambers contains the steam superheater bundles 51 and 52, the other contains the bundle of tubes 71 traversed by the gas to be heated.

The bundle of economizer tubes 31 and the associated economizer bundles 32 and 33 receive the feedwater through a feed inlet 311. The feedwater is the water of condensation or make-up water. These circuits terminate through pipes 322 and 332 in a tank 61 located in the upper portion of the equipment. These circuits or economizer bundles 31,32,33 are located towards the downstream end of the equipment.

The water in the liquid state which is contained in the bottom portion of the tank 61 is the water heated in the economizer tube bundles 31 to 33 mixed with the water of recirculation. It flow down through tubes 46 as far as a distributor collector 62 from which it is distributed to the vaporizer tubes. The latter are formed by bundles of tubes 41 and 42, by the walls of the enclosure 21 at the level of the combustion chamber and downstream of the latter, by the partition 24 and by the baffle tubes 45, and they are fed in parallel with preheated water. Thanks to their arrangement in a staggered pattern, the baffle tubes 45, while allowing the flue gases to pass through, protect from the radiation from the flame the bundles of tubes located immediately downstream of the combustion chamber: the superheater 52 and the gas heater 71.

The bundles of vaporizer tubes 41 and 42 are located respectively downstream of the bundles 51 and 71 which are traversed respectively by dry steam and by the gas. The feed to the vaporizer tubes 41 and 42 is assured either directly by the distributor collector 62 or by way of pipes such as 26, 411 and 421. At the output from the vaporizer tubes, the mixture of water and steam is led either directly or by way of pipes such as 27, 412 and 422 into the compartment 63 of the tank 61.

The latter, which is identical with that of a conventional boiler, includes internal fittings intended for separating the water and the steam. The dry steam leaves at the top portion of the tank 61 through a pipe 53 which leads it to the inlet to the bundles of tubes 51 and 52 in which it is superheated.

The direction of flow of the flue gases being taken as reference, the bundles 52 and 51 are heated in succession and are located downstream of the baffle tubes 45 and on one and the same side of the partition 24. They are fed in parallel with dry steam through the pipe 53 and respectively through the pipework 521 and 511. These superheater bundles 52 and 51 terminate respectively in pipework 522 and 512. The upstream superheater bundle 52 supplies steam the temperature of which is higher than that of the steam leaving the downstream superheater 51.

Preferably the heating equipment is integrated into an installation equipped with columns 92 for distillation and catalytic reforming and with a back-pressure steam turbine 91. The upstream bundle 52 then supplies the steam to the turbine and the downstream bundle 51 supplies the steam to the distillation columns.

The bundle of tubes 71 traversed by the gas to be heated is located between the baffle tubes 45 and the bundle of vaporizer tubes 42 but at the side of the partition 24 opposite from the side with the steam superheater bundles 51 and 52.

It includes on the one hand an inlet 72 located downstream with respect to the direction of flow of the flue gases and on the other hand an outlet 73 located further upstream. The inlet 72 is connected to a source (not shown) of reaction gas, and the outlet is connected to where it is to be used, for example to the reforming unit. At least one intermediate gas inlet, such as 74 or 75, is located between the main inlet 72 and the outlet 73. These intermediate inlets in case of need enable nonheated reaction gas to be injected and thus the outlet temperature of the gas to be regulated.

The partition 24, which separates the superheater bundles 51 and 52 from the gas heater bundle 71, is extended between the vaporizer bundles 41 and 42 and the secondary economizer bundles 32 and 33. These secondary economizer bundles are located downstream of the vaporizer bundles 41 and 42.

Downstream of the bundles 32 and 33, the flue gases have been cooled to about 350° C. Rocking dampers 81 and 82 are installed on opposite sides of the partition 24 downstream of the vaporizer bundles and of the secondary economizer bundles, or more precisely between these secondary economizer bundles 32 and 33 and the primary economizer bundle 31. These dampers control the flows of the flue gases through the chambers containing respectively the superheaters and the gas heater. The partition 24 stops at the level of the dampers 81 and 82. Consequently the primary economizer 31 located downstream of the dampers occupies the whole of the volume of the enclosure and is heated by the flue gases leaving the two chambers separated by the partition 24. On the water side the secondary encomizers 32 and 33 are connected in parallel onto the circuit 31 by way of pipes 321 and 331.

The combustion chamber 22 is dimensioned so that the temperature of the flue gases at the inlet to the bundle of tubes 71 is sufficient to obtain heating of the gas to the required temperature. The bundle of tubes 71 is located in a zone where the temperature of the flue gases is such that the gas is heated to a temperature in the range between 480° C. and 540° C.

Under these conditions it is easy to obtain from saturated steam at 160 bars a superheat temperature of 480° to 510° C. in the superheater 52.

Of course without departing from the scope of the invention, variants and improvements in detail may be conceived of and similarly use of equivalent means may be envisaged.

It would, for example, be possible to regulate the temperature of the gas by recycling flue gases taken off at the level of the dampers and reinjected upstream of the circuit 71.

What is claimed is:

1. Heating apparatus for use with an installation using steam and hot gas and including a combustion chamber (22) out of which waste gases pass which circulate within an enclosure (21) and during their passage provide heating of a bundle of vaporizer tubes (41, 42, 45), which supply water vapor to a bundle of super-heating tubes (51, 52) which provide super-heated steam and a bundle of tubes (71) in which a gas furnished by an exterior source of gas circulates, said vaporizer tubes (45) being located upstream of said bundle of tubes (71), said apparatus comprising a partition (24) which divides said enclosure into two chambers so as to separate two flows of waste gases, one of said chambers containing said bundle of tubes (71) in which said gas circulates and the other of said chambers containing at least one bundle (51, 52) of super-heating tubes which are supplied with dry steam damper means (81, 82) being provided on each side of said partition for controlling the flow of the waste gases through each of said chambers.

2. Apparatus according to claim 1, comprising screening tubes (45) which constitute part of said vaporizer tubes and which are intended to stop radiation from said combustion chamber, said screening tubes being located between said combustion chamber (22) and the bundle of tubes (71) through which the gas circulates.

3. Apparatus according to claim 1, wherein said bundle of tubes (71) through which the gas circulates includes at least one gas entry point (74, 75) located between the entry (72) to said bundle and the outlet (73) from said bundle into said enclosure.

4. Apparatus according to claim 1, wherein on both sides of said partition (24) there are two bundles of vaporizer tubes (41, 42), which receive pre-heated water in parallel.

5. Apparatus according to claim 1, comprising two bundles (51, 52) or super-heating tubes which are supplied with dry steam and are successively heated by the waste gases.

6. Apparatus according to claim 1, comprising two secondary economizers (32, 33) separated by said partition (24) and supplying pre-heated water to said bundles of vaporizer tues (41, 42).

7. Apparatus according to claim 6, comprising, downstream of said damper units and of said partition, a primary economizer (31) comprising a bundle of economizer tubes heated by the waste gases leaving said two chambers, said economizer (31) being supplied with feed water and furnishing pre-heated water to said secondary economizers (32, 33).

8. Apparatus according to claim 7, wherein said secondary economizers (32, 33) are connected in parallel with said primary economizer (31).

9. Apparatus according to claim 1, wherein the circuits for the water and the vapor are tested at at least 120 bars.

10. Apparatus according to claim 1, including a recycling device for the waste gases which are removed at the position of said damper units and reinjected upstream of the bundle of tubes (71) through which a gas passes.

11. Application of the apparatus according to claim 1 to a refining plant, wherein the upstream bundle of super-heating tubes (52) which is supplied with dry steam feeds a steam turbine, and the downstream bundle of super hearing tubes (51) supplies at least one treatment unit of said plant.

* * * * *